Figure 1:
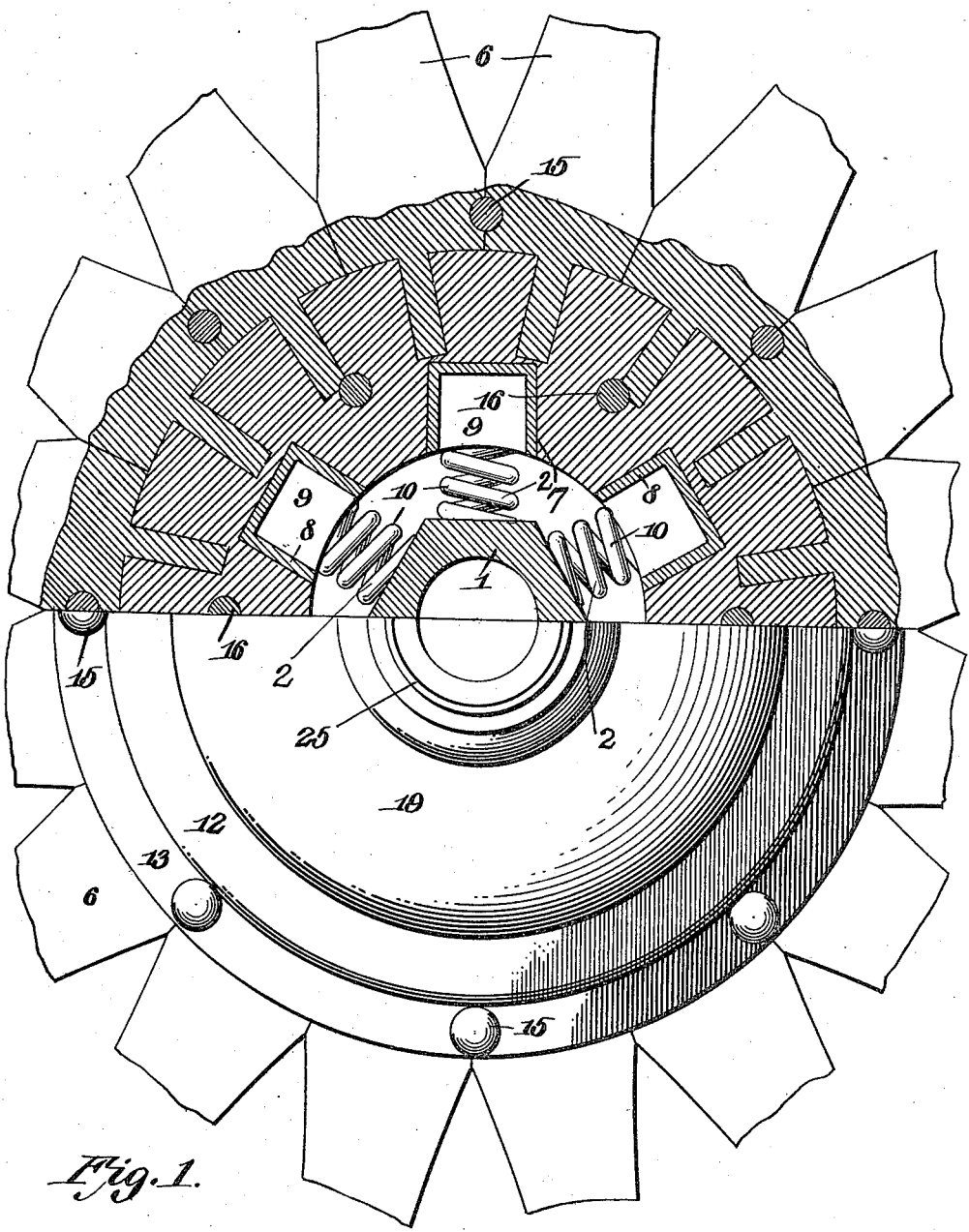

W. E. ADAMS.
SPRING HUB FOR VEHICLE WHEELS.
APPLICATION FILED NOV. 27, 1909.

1,059,920.

Patented Apr. 22, 1913.

2 SHEETS—SHEET 1.

Witnesses
D. B. Galt.

Inventor
William E. Adams.
By Victor J. Evans
Attorney

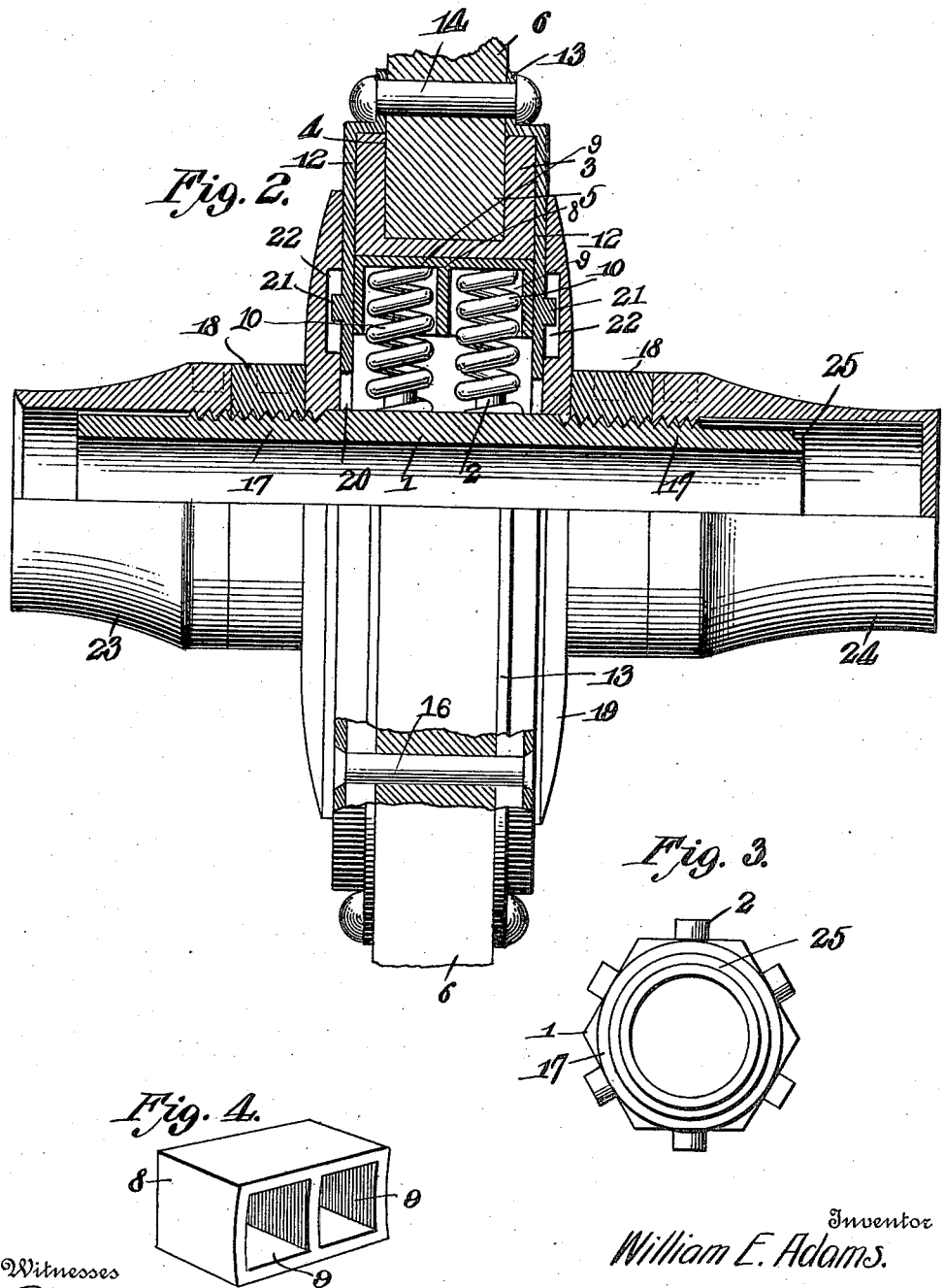

UNITED STATES PATENT OFFICE.

WILLIAM E. ADAMS, OF LA FAYETTE, LOUISIANA.

SPRING-HUB FOR VEHICLE-WHEELS.

1,059,920.  Specification of Letters Patent.  Patented Apr. 22, 1913.

Application filed November 27, 1909. Serial No. 530,118.

*To all whom it may concern:*

Be it known that I, WILLIAM E. ADAMS, a citizen of the United States of America, residing at La Fayette, in the parish of Lafayette and State of Louisiana, have invented new and useful Improvements in Spring-Hubs for Vehicle-Wheels, of which the following is a specification.

This invention relates to spring hubs for vehicle wheels, and has for an object to provide effective elastic means for absorbing the shock of the wheel incident to its coming in contact with obstructions or the like.

The above mentioned and other objects are attained by the construction, combination and arrangement of parts, as disclosed on the drawings, set forth in this specification, and particularly pointed out in the appended claim.

In the drawings, forming a portion of this specification and in which like numerals of reference indicate similar parts in the several views:—Figure 1 is a sectional elevation of my improved spring hub. Fig. 2 is a similar view taken on a line at right angles to Fig. 1. Fig. 3 is a detail end view of the box. Fig. 4 is a detail perspective view of one of the spring seats.

My improved hub consists of a box 1 which is hollow throughout its length to receive the ordinary spindle of a vehicle axle. The central portion of the box is enlarged and in cross section it is of hexagonal form as best shown in Fig. 3 of the drawings. Each flat face of the central enlarged portion of the box is provided with a pair of suitably spaced outwardly extending pins or short studs 2 for a purpose to be hereinafter described. The main body 3 of the hub is of circular form preferably and it is formed with peripheral pockets 4 for receiving the tangs or tenons 5 of the spokes 6. The said main body portion of the hub is also formed with a plurality of pockets 7 in which are mounted metal seats 8, each seat being provided with a pair of sockets 9 which are arranged immediately in line with the spaced pins 2 of the box 1. Elastic means are interposed between the box and the seats 8, the said means preferably consisting of helical extensile springs 10 whose inner ends are engaged with the pins 2 whose outer ends are operatively seated in the sockets 9 of the seats 8. The main body 3 of the hub is formed with a central passage 11 which is of a diameter exceeding that of the central portion of the box.

Metal members 12 are arranged at the sides of the main body 3 of the hub and their marginal edges are offset to fit over the outer peripheral edge portions of the said main body of the hub. The said members 12 are also stamped to form flanges 13 which are secured to the spokes 6 by retaining pins 14. The retaining pins are preferably passed through opposing semi-circular cavities 15 in the spokes as shown in Fig. 1 of the drawings. The members 12 are also secured to the body 3 of the hub by means of pins 16. The box 1 is formed outwardly of the central enlarged portion with exteriorly threaded portions 17 upon which are mounted jam nuts 18. Plates 19 are engaged with the enlarged portion of the box and are disposed immediately outside of the members 12, the jam nuts being arranged to hold the plates 19 properly associated with respect to the members 12. The members 12 are formed with central apertures 20 whose walls are spaced from the outer surfaces of the central portion of the box 1 to accommodate sliding movement of the wheel at right angles to its axis of rotation. The members 12 are provided with outwardly extending lugs 21 which are slidable in longitudinally extending grooves 22 in the inner faces of the plates 19. The threaded portions of the box 1 have engaged therewith cap members 23 and 24, the latter serving as a sand or dust guard and for this purpose it is closed at its outer end. The outer end of the box is formed with a washer-receiving seat 25.

The construction of the spring hub herein shown and described is such that an effective spring wheel can be produced at a very low cost. The elastic means are so arranged between the main body of the hub and the box 1 thereof that they are housed and effectively guarded against dust or sand. Should the spindle become bound in the box the parts 12 and 19 will revolve together and the springs cannot become misplaced. It will be appreciated that the engagement of the lugs 21 in the grooves 22 permits free sliding movement of the main body portion of the hub in a line at right angles to the axis of rotation and the said main body of the hub and the members 12 which are secured to the main body may slide independently of the plates 19.

I claim:—

In a hub, the combination with a tubular box provided at its medial portion with a series of plane faces, of a main body member encircling the box, pockets formed in the body member, sockets secured in the said pockets, springs seated in the said sockets and projecting therefrom to engage the plane faces of the said box to space the said main body member from the said box, plates carried by the box adjacent the medial portion thereof and spaced apart with the main body member interposed therebetween, circular members carried by the main body member, lugs on the circular members and operable in grooves in the said plates, circular flanges formed with the said circular members, spokes radiating from the said main body member and interposed between the said flanges, and bolts passing through the said flanges and the said spokes to secure the same rigidly on the said main body member.

In testimony whereof I affix my signature in presence of two witnesses.

WILLIAM E. ADAMS.

Witnesses:
O. P. GUILBEARE,
F. AUTHEMENT.

Copies of this patent may be obtained for five cents each, by addressing the "Commissioner of Patents, Washington, D. C."